United States Patent
Wade

[15] 3,663,254
[45] May 16, 1972

[54] AQUEOUS COATING COMPOSITIONS FOR GLASS ARTICLES

[72] Inventor: Robert C. Wade, Ipswich, Mass.
[73] Assignee: Ventron Corporation, Beverly, Mass.
[22] Filed: Feb. 22, 1971
[21] Appl. No.: 117,828

[52] U.S. Cl. ........................................106/271, 117/124 E
[51] Int. Cl. ..................................C08h 9/06, C03c 17/22
[58] Field of Search......................106/271; 117/124 B, 124 E

[56] References Cited

UNITED STATES PATENTS
3,368,915  2/1968  Carl..................................117/124 B

*Primary Examiner*—Morris Liebman
*Assistant Examiner*—P. R. Michl
*Attorney*—J. Harold Boss

[57] ABSTRACT

Improved coating compositions of unusual durability for protection of glassware from scratching and which may be applied to the ware by a single application as the ware emerges from the cool end of the annealing lehr are disclosed. The coating compositions are water solutions of ammonium zirconyl carbonate and a colloidally dispersed polyethylene of low molecular weight of between about 1,200 and 2,000.

3 Claims, No Drawings

AQUEOUS COATING COMPOSITIONS FOR GLASS ARTICLES

The requirements of the glassware industry for durable scratch resistant coatings of glass containers is well known. This invention provides an improved water-based, non-corrosive coating composition which meets all of the requirements for protection of the glassware and can be applied to the ware as it emerges from the cool end of the annealing lehr in a single application.

Many coating compositions and processes for applying these coatings have been disclosed in the past. Almost all of these that have given the required protective properties to the glass surface as determined by the procedures described in Technical Bulletin No. 64, "Methods for Testing Lubricity and Scratch Resistance of Coated Glass Containers" by the Advisory Subcommittee on Test Levels and Methods, Committee on Testing Procedures, Glass Container Manufacturers Institute, have involved a two-step treatment of the glass surface. The first treatment requires exposure of the glass surface at or above the pyrolyzing temperature to a pyrolyzable metal compound whereby an invisible oxide layer of the metal is deposited on the glass surface. Metal compounds disclosed have been the metal halides, alcoholates (ortho esters), or chelates of titanium, zirconium, tin, silicon and the like. The glassware is then cooled in the annealing lehr to a temperature below 450° F and sprayed with a lubricious composition such as polyethylene or wax emulsions, other polymeric solutions, dispersions and emulsions, soaps and other fatty compounds, and fluorocarbons.

These methods and articles of manufacture have been thoroughly described in the following references:

| Carl et al. | U.S. Pat. Nos. 3,323,889 and 3,368,915 |
|---|---|
| Gerhardt | U.S. Pat. No. 3,379,559 |
| Scholes | U.S. Pat. No. 3,386,855 |
| Dunton, et al. | U.S. Pat. No. 3,387,994 |
| Bruss, et al. | U.S. Pat. No. 3,414,429 |
| Levene | U.S. Pat. No. 3,418,153 |
| Rawski | U.S. Pat. No. 3,418,154 |
| Scholes, et al. | U.S. Pat. No. 3,420,693 |
| Bogard | U.S. Pat. No. 3,487,035 |

These double coating methods described in the above references are the only methods known to date for producing glass articles of sufficient scratch resistance, lubricity, labeling characteristics, appearance and resistance to leaching with water to meet the needs for much of the glass packaging industry. Thus, in spite of many serious disadvantages of these methods, they are widely used on large scale by producers of glass containers. These disadvantages include very expensive equipment to apply the metal oxide coating; inefficient utilization of expensive metal compounds such as tin tetrachloride, organotin compounds, alkyl titanates, alkyl zirconates, etc.; corrosive atmospheres due to hydrolysis of metal halides to produce acid gases, uneven metal oxide coatings on the glass containers; corrosion of bottle and jar caps due to trace amounts of residual acids on the surface glass on the lip and threads of the container. Furthermore, after application of the metal oxide coating, the ware must be annealed and then sprayed or dipped with a lubricious coating.

Much glassware is also coated by a single spray of a soap, wax, or polymer emulsion, but these coatings only provide temporary protection under very mild handling conditions. They are easily removed by water and provide very modest scratch resistance. Another single spray composition which provides somewhat better resistance to leaching is disclosed by Legally in U.S. Pat No. 3,108,920. This composition is an aqueous solution of a polymer of a vinyl alkoxysilane, maleic anhydride and the vinyl ester of a fatty acid. It is expensive and does not provide the wet and dry scratch resistance of over 50 lbs. load which is needed for glassware processed in modern high-speed packaging systems.

There is a need, therefore, for an aqueous composition that is non-corrosive, which can be applied from a single spray or dip and which will provide the protection, appearance, durability and ease of labeling that present two-stage systems provide.

DESCRIPTION OF THE PRESENT INVENTION

I have discovered that a single aqueous mixture containing small amounts of ammonium zirconyl carbonate and a colloidal dispersion of low molecular weight polyethylene, e.g., about 1,200 to 2,000, provide protective coatings to glassware equivalent to those obtained with the two-stage treating methods when this mixture is applied to the glassware as it emerges from the annealing oven at temperatures below 450° C. These compositions may contain from 0.1 to 1 percent $ZrO_2$ [present in the solution as $(NH_4)_3ZrOH(CO_3)_3$], and from 0.25-2 percent of the polyethylene. The pH of these solutions is above 7. When applied to the container at temperatures below 450° F, but above 140° F, clear, transparent coatings are produced of remarkable durability and scratch resistance. While I do not wish to be limited to any theory as to how my novel composition functions, I believe that the zirconium moiety is preferentially attracted to the glass surface where it reacts with silanol groups to form a chemically resistant zirconium oxide coating on the glass.

The evaporation of water from ammonium zirconyl carbonate precipitates clear films of colloidal $ZrO_2$ as follows:

$$(NH_4)_3ZrOH(CO_3)_3 \; 3NH_3 + 3CO_2 + ZrO_2 + 2H_2O$$

This phenomena is described in a Product Data Sheet ZC-1 by TAM Division of National Lead Company. The micelles of precipitated zirconium dioxide are extremely reactive and complex very tightly with oxygenated materials — and with the dispersed polyethylene contained in the composition. It is well known that these polyethylene emulsions are prepared from oxidized, low molecular weight polyethylene waxes as described in U.S. Pat. Nos. 3,323,889; 3,368,915; 3,386,855; and 3,420,693. A very satisfactory polyethylene emulsion which is widely used in the industry is "Valspex 155-53" manufactured by Valchem Division of United Merchants and Manufacturers, Inc. and is preferred in my compositions. The application of my compositions is carried out by spraying or dipping the ware as it emerges from the annealing lehr at temperature below 450° C and preferably between 250° and 140° F. Water quickly evaporates from the glass surface leaving the complex zirconium oxide-polyethylene protective coating bound tightly to the glass surface. Furthermore, no corrosive anions are present to corrode the lehr, conveyor belts, etc. (only trace amounts of $HN_3$ and $CO_2$ are evolved). No corrosive residues remain on glassware to cause corrosion of caps, no obnoxious or acid fumes are released to cause environemental pollution, the efficiency of utilization is very good, uniformity of the coating is good, and no new equipment beyond that which already is widely used for cold end spraying is required.

The invention is illustrated further by the following specific examples:

EXAMPLE 1

Coating compositions containing 0.1 to 1 percent $ZrO_2$ as a water solution of $(NH_4)_3ZrOH(CO_3)_3$ and 0.25-1.5 percent polyethylene solids as Valspex 155-53 were prepared and sprayed on glass containers as emerged from the annealing lehr at 140°-180° F. All coatings gave improved scratch resistances wet, dry and fogged ( 30 lbs. load) and slip angle (less than 15°) over bottles treated only with polyethylene. They resisted removal by hot water soaking (20 minutes at 140° F) and over 20 seconds' exposure to live steam. Those that contained over 0.5 percent $ZrO_2$ gave a somewhat hazy appearance to the container. Those compositions which contained less than 0.5 percent polyethylene gave scratch resistances below 50 lb. loading but greater than the 15-20 lb. loading obtained with polyethylene alone. Labeling was satisfactory with casein and alkaline jelly adhesives.

EXAMPLE 2

A spraying composition containing 0.25 percent $ZrO_2$ [as $(NH_4)_3ZrOH(CO_3)_3$] and 1 percent polyethylene was prepared by mixing the two ingredients in the proper proportions with water. This composition was sprayed on flint glass bottles as they emerged from the annealing lehr at a temperature of 180°–220° F. The coatings were clear. The static load (scratch test) showed both wet and dry scratch resistance greater than 190 lbs. The slip angle was 10° (wet and dry). After soaking 20 min. in water at 140° C the dry scratch resistance was 160 lbs. and the wet scratch resistance over 190 lbs. After treating the bottles with live steam for 80 seconds, the wet and dry scratch resistance was over 150 lbs. Bottles labeled satisfactorily with both casein and alkaline jelly adhesives. These results are the equivalent of the best results obtained in the presently used two-stage treating methods.

I claim:

1. An aqueous coating composition for glass articles containing from about 0.1 to about 1 percent by weight of zirconium dioxide present as a solution of ammonium zirconyl carbonate [$(NH)_3ZrOH(CO_3)_3$] and from about 0.25 to about 2 percent by weight of a colloidal dispersion of an oxidized polyethylene having a molecular weight between about 1,200 and about 2,000.

2. An aqueous coating composition as defined by claim 1 wherein the amount of zirconium dioxide is between about 0.5 and about 1.5 percent by weight and wherein the amount of polyethylene is between about 0.5 and about 1.5 percent by weight.

3. An aqueous coating composition as defined by claim 1 wherein the amount of zirconium dioxide is about 0.25 percent by weight and wherein the amount of polyethylene is about 1 percent by weight.

* * * * *